United States Patent [19]

Brennan et al.

[11] Patent Number: 5,731,094
[45] Date of Patent: Mar. 24, 1998

[54] HYDROXY-PHENOXYETHER POLYESTER COEXTRUDED LAMINATES

[75] Inventors: David J. Brennan, Midland, Mich.; Jerry E. White, Lake Jackson, Tex.; Mark A. Barger; H. Craig Silvis, both of Midland, Mich.

[73] Assignee: The Dow Chemical Company, Midland, Mich.

[21] Appl. No.: 735,284

[22] Filed: Oct. 22, 1996

[51] Int. Cl.$^6$ ............................ B32B 27/34; B32B 27/36
[52] U.S. Cl. ........................... 428/474.4; 428/475.5; 428/480
[58] Field of Search ..................... 428/474.4, 475.5, 428/480

[56] References Cited

U.S. PATENT DOCUMENTS 5,472,753  12/1995  Farha ........................ 428/35.7

Primary Examiner—D. S. Nakarani

[57] ABSTRACT

A laminate structure comprises one or more layers of a polyester and one or more layers of a hydroxy-phenoxyether polymer. The laminate structure can be prepared by coextruding one or more layers of a polyester and one or more layers of a hydroxy-phenoxyether polymer. The laminate structure can be fabricated into articles using conventional fabrication techniques such as compression molding, injection molding, blow molding, extrusion, solvent casting, calendering and thermoforming.

8 Claims, No Drawings

HYDROXY-PHENOXYETHER POLYESTER COEXTRUDED LAMINATES

BACKGROUND OF THE INVENTION

This invention relates to a multilayer structure, and more particularly to a multilayer thermoformable packaging material including a barrier layer.

Crystalline polyesters such as polyethylene terephthalate (PET) are used commercially in the packaging of various materials, such as seasonings, carbonated beverages, detergents, cosmetics, etc. See "Thermoplastic Polyester Resins for Containers" D. P. Callander, *Polym. Sci.*, 25(8), 453–457 (1985). While PET exhibits adequate gas barrier properties for containing and storing some materials, it is inadequate for containing and storing materials such as beer, wine and low acid foods such as meats or vegetables.

In view of the limited barrier properties of crystalline polyesters, it would be highly desirable to provide a structure which has adequate barrier properties for the intended application and good thermal processability.

An attractive approach to such a structure involves utilizing a laminate of PET with another thermoplastic that has substantially better barrier properties than does PET. As described in U.S. Pat. No. 5,472,753, hydroxy phenoxyether polymers, which are often referred to as phenoxy-type thermoplastics, are known to provide improved barrier properties in PET laminates, but these structures require the use of an amorphous polyester as adhesive layer between PET and the hydroxy phenoxyether polymer or in a blend with the hydroxy phenoxyether polymer in order to retain good physical properties. Clearly, it would be an advantage to manufacture physically robust laminates of hydroxy phenoxyether polymers and PET without the need for and the additional cost of an amorphous polyester to promote adhesion between polymer layers in the laminate structure.

SUMMARY OF INVENTION

In a first aspect, the present invention is a laminate structure comprising one or more layers of a crystalline polyester or a polyamide and one or more layers of a hydroxy-phenoxyether polymer.

In a second aspect, the present invention is a packaging material comprising a laminate structure having one or more layers of a crystalline polyester or a polyamide and one or more layers of a hydroxy-phenoxyether polymer.

In a third aspect, the present invention is a process for preparing a laminate which comprises coextruding one or more layers of a polyester or a polyamide and one or more layers of a hydroxy-phenoxyether polymer.

DETAILED DESCRIPTION OF THE INVENTION

Preferably, the hydroxy-phenoxyether polymers employed in the practice of the present invention are:

(1) hydroxy-functional polyethers having repeating units represented by the Formula:

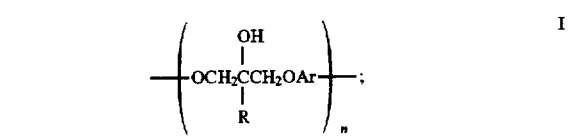

(2) amide- and hydroxymethyl-functionalized polyethers having repeating units represented by the Formula:

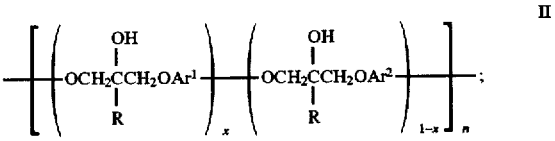

(3) hydroxy-functional poly(ether sulfonamides) having repeating units represented by the Formula:

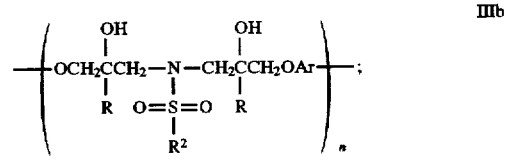

(4) poly(hydroxy amide ethers) having repeating units represented independently by any one of the Formulas:

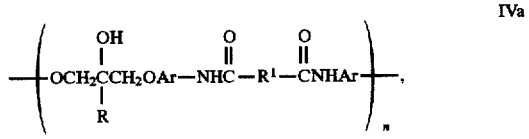

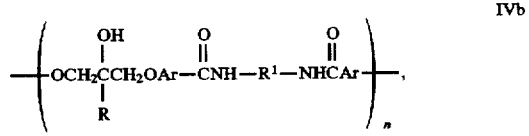

(5) poly(hydroxy ester ethers) having repeating units represented by the Formula:

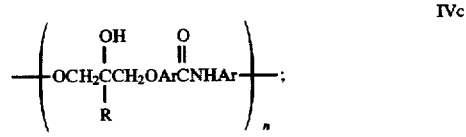

(6) poly(hydroxy amide ethers) having repeating units represented by any one of the Formulas:

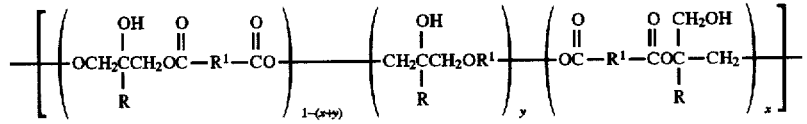

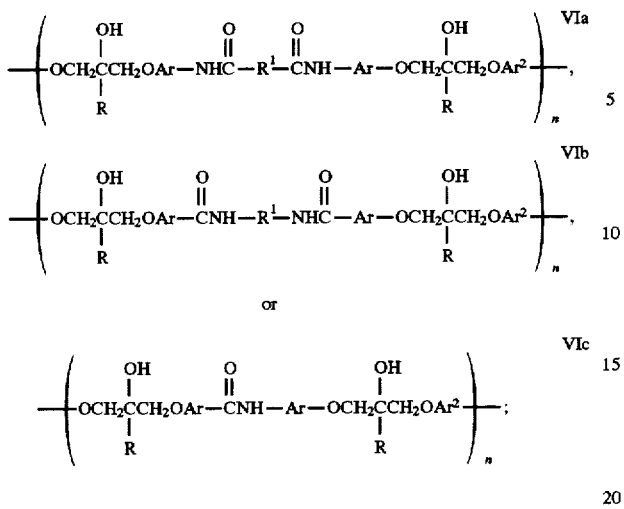

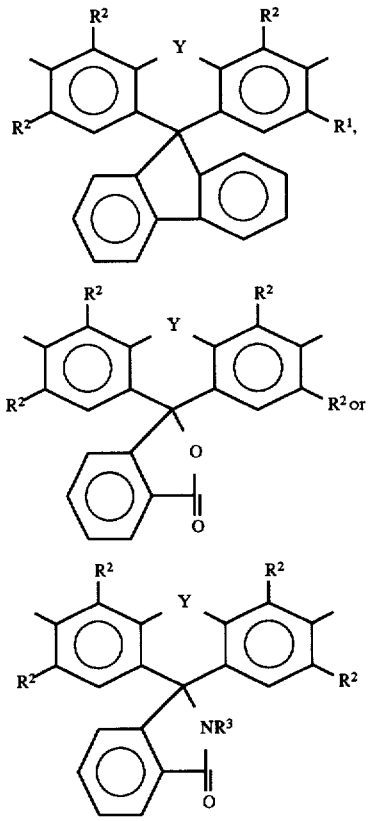

poly(hydroxyamino ethers) having repeating units represented by the Formula:

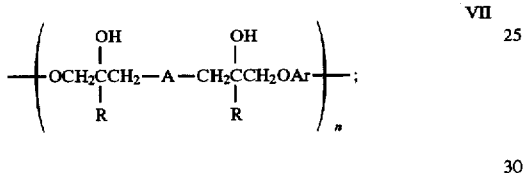

and (8) hydroxy-phenoxyether polymers having repeating units represented by the Formula:

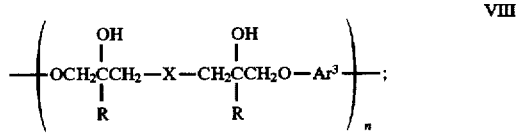

wherein each Ar individually represents a divalent aromatic moiety, substituted divalent aromatic moiety or heteroaromatic moiety, or a combination of different divalent aromatic moieties, substituted aromatic moieties or heteroaromatic moieties; R is individually hydrogen or a monovalent hydrocarbyl moiety; each $Ar^1$ is a divalent aromatic moiety or combination of divalent aromatic moieties bearing amide or hydroxymethyl groups; each $Ar^2$ is the same or different than Ar and is individually a divalent aromatic moiety, substituted aromatic moiety or heteroaromatic moiety or a combination of different divalent aromatic moieties, substituted aromatic moieties or heteroaromatic moieties; $R^1$ is individually a predominantly hydrocarbylene moiety, such as a divalent aromatic moiety, substituted divalent aromatic moiety, divalent heteroaromatic moiety, divalent alkylene moiety, divalent substituted alkylene moiety or divalent heteroalkylene moiety or a combination of such moieties; $R^2$ is individually a monovalent hydrocarbyl moiety; A is an amine moiety or a combination of different amine moieties; X is an amine, an arylenedioxy, an arylenedisulfonamido or an arylenedicarboxy moiety or combination of such moieties; and $Ar^3$ is a "cardo" moiety represented by any one of the Formulas:

wherein Y is nil, a covalent bond, or a linking group, wherein suitable linking groups include, for example, an oxygen atom, a sulfur atom, a carbonyl atom, a sulfonyl group, or a methylene group or similar linkage; n is an integer from about 10 to about 1000; x is 0.01 to 1.0; and y is 0 to 0.5.

The term "predominantly hydrocarbylene" means a divalent radical that is predominantly hydrocarbon, but which optionally contains a minor amount of heteroatomic moiety such as oxygen, sulfur, imino, sulfonyl, sulfoxyl, and the like.

The hydroxy-functional polyethers represented by Formula I can be prepared, for example, by allowing a diglycidyl ether or combination of diglycidyl ethers to react with a dihydric phenol or a combination of dihydric phenols using the process described in U.S. Pat. No. 5,164,472, incorporated herein by reference in its entirety. Alternatively, the hydroxy-functional polyethers are obtained by allowing a dihydric phenol or combination of dihydric phenols to react with an epihalohydrin by the process described by Reinking, Barnabeo and Hale in the Journal of Applied Polymer Science, Volume 7, page 2135 (1963).

The amide- and hydroxymethyl-functionalized polyethers represented by Formula II can be prepared, for example, by reacting the diglycidyl ethers, such as the diglycidyl ether of bisphenol A, with a dihydric phenol having pendant amido, N-substituted amido and/or hydroxyalkyl moieties, such as 2,2-bis(4-hydroxyphenyl)acetamide and 3,5-dihydroxybenzamide. These polyethers and their preparation are described in U.S. Pat. Nos. 5,115,075 and 5,218,075, incorporated herein by reference in its entirety.

The hydroxy-functional poly(ether sulfonamides) represented by Formula III are prepared, for example, by polymerizing an N,N'-dialkyl or N,N'-diaryldisulfonamide with a diglycidyl ether as described in U.S. Pat. No. 5,149,768, incorporated herein by reference in its entirety.

The poly(hydroxy amide ethers) represented by Formula IV are prepared by contacting a bis(hydroxyphenylamido) alkane or arene, or a combination of 2 or more of these compounds, such as N,N'-bis(3-hydroxyphenyl) adipamide or N,N'-bis(3-hydroxyphenyl)glutaramide, with an epihalohydrin as described in U.S. Pat. No. 5,134,218, incorporated herein by reference in its entirety.

The poly(hydroxy ester ethers) represented by Formula V are prepared by reacting diglycidyl ethers of aliphatic or aromatic diacids, such as diglycidyl terephthalate, or diglycidyl ethers of dihydric phenols with, aliphatic or aromatic diacids such as adipic acid or isophthalic acid. These polyesters are described in U.S. Pat. No. 5,171,820, incorporated herein by reference in its entirety.

The poly(hydroxy amide ethers) represented by Formula VI are preferably prepared by contacting an N,N'-bis (hydroxyphenylamido)alkane or arene with a diglycidyl ether as described in U.S. Pat. No. 5,089,588 and 5,143,998, incorporated herein by reference in their entireties.

The polyetheramines represented by Formula VII are prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. These polyetheramines are described in U.S. Pat. No. 5,275,853, incorporated herein by reference in its entirety.

The hydroxy-phenoxyether polymers represented by Formula VIII are prepared, for example, by contacting at least one dinucleophilic monomer with at least one diglycidyl ether of a cardo bisphenol, such as 9,9-bis(4-hydroxyphenyl) fluorene, phenolphthalein, or phenolphthalimidine or a substituted cardo bisphenol, such as a substituted bis (hydroxyphenyl)fluorene, a substituted phenolphthalein or a substituted phenolphthalimidine under conditions sufficient to cause the nucleophilic moieties of the dinucleophilic monomer to react with epoxy moieties to form a polymer backbone containing pendant hydroxy moieties and ether, imino, amino, sulfonamido or ester linkages. These hydroxy-phenoxyether polymers are described in U.S. application Ser. No. 131,110, filed Oct. 1, 1993, incorporated herein by reference in its entirety.

The hydroxy-phenoxyether polymers commercially available from Phenoxy Associates, Inc. are suitable for use in the present invention. These hydroxy-phenoxyether polymers are the condensation reaction products of a dihydric polynuclear phenol, such as bisphenol A, and an epihalohydrin and have the repeating units represented by Formula I wherein Ar is an isopropylidene diphenylene moiety.

The hydroxy-phenoxyether polymers available from Phenoxy Associates, Inc. and the process for preparing them are described in U.S. Pat. No. 3,305,528, incorporated herein by reference in its entirety.

Most preferably, the hydroxy-phenoxyether polymers employed in the practice of the present invention are the polyetheramines represented by Formula VII.

The invention is described especially in relation to polyethylene terephthalate (PET) but is, in principle, applicable to many other thermoplastics of the polyester or polyamide type.

Examples of such other materials include polyhexamethylene adipamide, polycaprolactone, polyhexamethylene sebacamide, polyethylene 2,6- and 1,5-naphthalate (PEN), polytetramethylene 1,2-dioxybenzoate and copolymers of ethylene terephthalate and ethylene isophthalate.

Polyesters and methods for their preparation (including the specific monomers employed in their formation, their proportions, polymerization temperatures, catalysts and other conditions) are well-known in the art and reference is made thereto for the purposes of this invention. For purposes of illustration and not limitation, reference is particularly made to pages 1–62 of Volume 12 of the Encyclopedia of Polymer Science and Engineering, 1988 revision, John Wiley & Sons.

Typically, polyesters are derived from the reaction of a di- or polycarboxylic acid with a di- or polyhydric alcohol. Suitable di- or polycarboxylic acids include polycarboxylic acids and the esters and anhydrides of such acids, and mixture thereof. Representative carboxylic acids include phthalic, isophthalic, adipic azelaic, terephthalic, oxalic, malonic, succinic, glutaric, sebacic, and the like. Dicarboxylic components are preferred. Terephthalic acid is most commonly employed and preferred in the preparation of polyester films. α, β-unsaturated di- and polycarboxylic acids (including esters or anhydrides of such acids and mixtures thereof) can be used as partial replacement for the saturated carboxylic components. Representative α, β-unsaturated di- and polycarboxylic acids include maleic, fumaric, aconitic, itaconic, mesaconic, citraconic, monochloromaleic and the like.

Typical di- and polyhydric alcohols used to prepare the polyester are those alcohols having at least two hydroxy groups, although minor amounts of alcohol having more or less hydroxy groups may be used. Dihydroxy alcohols are preferred. Dihydroxy alcohols conventionally employed in the preparation of polyesters include diethylene glycol; dipropylene glycol; ethylene glycol; 1,2-propylene glycol; 1,4-butanediol; 1,4-pentanediol; 1,5-hexanediol, 1,4-cyclohexanedimethanol and the like with 1,2-propylene glycol being preferred. Mixtures of the alcohols can also be employed. The di- or polyhydric alcohol component of the polyester is usually stoichiometric or in slight excess with respect to the acid. The excess of the di- or polyhydric alcohol will seldom exceed about 20 to 25 mole percent and usually is between about 2 and about 10 mole percent.

The polyester is generally prepared by heating a mixture of the di- or polyhydric alcohol and the di- or polycarboxylic component in their proper molar ratios at elevated temperatures, usually between about 100° C. and 250° C. for extended periods of time, generally ranging from 5 to 15 hours. Polymerization inhibitors such as t-butylcatechol may advantageously be used.

The thickness of each layer in the laminate structure is dependent on a number of factors including the intended use, materials stored in the container, the length of storage prior to use, and the specific composition employed in each layer of the laminate.

In general, the laminate structure will have a total thickness of from about 0.5 to about 500 mils, preferably from about 1.0 to about 250 mils; with the thickness of the hydroxy-phenoxyether layer(s) being from about 0.05 to about 100 mils, preferably from about 0.1 to about 50 mils; and the thickness of the poly-ester layer being from about 0.45 to about 400 mils, preferably from about 0.9 to about 200 mils.

The laminate structure of the present invention can be produced using conventional extrusion techniques such as feedblock coextrusion, multimanifold die coextrusion, or combinations of the two, or may be produced by a laminating procedure whereby self-sustaining lamina are bonded together by applications of heat and pressure and reference is made thereto for the purposes of this invention. The volume (thickness) of each individual layer may be controlled as it is extruded. Thus, the overall thickness of the multilayer structure may be controlled to produce a film or sheet of desired thickness. The laminate structure may also be formed by solvent spraying or solution casting (1) a hydroxy-phenoxyether polymer onto a polyester or polyamide film or sheet or (2) a polyester or polyamide onto a hydroxy-phenoxyether polymer film or sheet. Solvent casting is a well known process and is described, for example, in the *Plastics Engineering Handbook* of the Society of the Plastics Industry, Inc., 4th Edition, page 448.

The laminate structure of the present invention can be fabricated into articles using conventional thermoforming or other fabrication techniques. A typical thermoforming process comprises heating a thermoplastic sheet to its softening point and then shaping the sheet at a forming station utilizing various molds and/or vacuum or air pressure assists. Other thermoforming techniques include solid phase pressure forming (SPPF) and the so-called scrapless forming process (SFP). For purposes of this disclosure, references to thermoforming techniques or thermoformable structures will include SPPF and SFP. During fabrication, the molecules of the polymer can be oriented by methods well known in the art. One such method is described in U.S. Pat. No. 5,382,693, incorporated herein by reference. Orientation is also described in *Plastics Engineering Handbook* of the Society of the Plastics Industry, Inc., 4th Ed., p. 113–115, 182 and 183. Articles formed therefrom include containers and molded parts, blown and cast multilayer films, foam sheets, tubes, pipes, fibers and the like. Examples of such articles include flexible and rigid containers used for the preservation of food, drink, medicine and other perishables.

The following examples are for illustrative purposes only and are not intended to limit the scope of this invention.

EXAMPLE 1

Poly(ethylene terephthalate) (Formula I or PET; Cleartuf™ 8006) and poly(hydroxy amino ether) (Formula 2; melt index=3.0) are dried in a dehumidifying oven for a minimum of twelve hours at 176° C. and 65° C., respectively prior to processing. The two materials then are coextruded using an inset feedblock configured to produce a three-layer laminate with exterior layers of PET and an interior layer (15 percent by volume) of poly(hydroxy amino ether)*. The PET and poly(hydroxy amino ether) components are extruded using a 2 inch single screw extruder operating at 280° C. and a 1 inch single screw extruder operating at 200° C. respectively. The materials are then passed through a feedblock (maintained at 220° C.) and a 4 inch wide variable thickness manifold die (maintained at 260° C.) to produce 3.75 inch wide laminates of varying thickness (0.025–0.095 inch thick). The extrudates are then quenched on cold rolls to avoid crystallization of the PET component. Overall extrusion rates varied from 25 to 117 pounds per hour.

Impact resistance is measured at 22.8° C. for the laminates according to ASTM method D3763-93 using a Dynatup model 8000 drop tower. Specimen size is 1.8 inches, and specimens, clamped with an unsupported area of 1.25 inches by 1.25 inches, are impacted with a tup of 0.625 inches diameter. The tup is attached to a cross-head weighing 138.5 pounds and dropped from a height of twelve inches, resulting in a test speed of eight fee/second. All samples exhibited ductile failure and showed little or no delamination after impact; Table 1 summarizes impact properties of laminates prepared at the extrusion rates and with the thicknesses shown.

TABLE I

| Extrusion Rate, pounds/hour | Thickness, mil | Maximum Load, pounds | Total Energy, foot-pounds |
|---|---|---|---|
| 25 | 50 | 266 | 10.2 |
| 25 | 26 | 220 | 8.8 |
| 41 | 78 | 229 | 10.1 |
| 58 | 78 | 680 | 32.5 |
| 77 | 78 | 756 | 29.4 |
| 99 | 78 | 713 | 16.8 |
| 117 | 78 | 828 | 39.7 |

EXAMPLE 2

The experiment of Example 1 is repeated except that the extrusion temperature of the poly(hydroxy amino ether) is 240° C. Impact result for laminates produced in this Example, all of which exhibited ductile failure with little or no delamination, are summarized in Table 2.

TABLE II

| Extrusion Rate, pounds/hour | Thickness, mil | Maximum Load, pounds | Total Energy, foot-pounds |
|---|---|---|---|
| 20 | 78 | 382 | 13.2 |
| 30 | 78 | 453 | 16.3 |
| 40 | 78 | 594 | 26.5 |

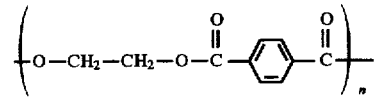

1(PET)

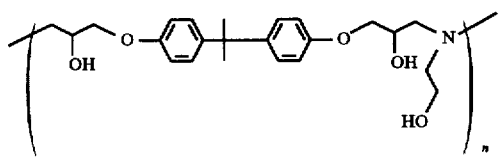

2(PHAE)

What is claimed is:

1. A laminate structure comprising one or more layers of a crystalline polyester or a polyamide and one or more layers of a hydroxy-phenoxyether polymer, wherein said hydroxy-phenoxyether polymer layer is adhered directly to the crystalline polyester or polyamide layer without an adhesive layer therebetween.

2. The laminate structure of claim 1 comprising outer layers of the crystalline polyester or a polyamide and a core layer of the hydroxy-phenoxyether polymer.

3. The laminate structure of claim 1 comprising outer layers of the hydroxy-phenoxyether polymer and a core layer of the crystalline polyester or a polyamide.

4. The laminate structure of claim 1 wherein the hydroxy-phenoxyether polymer is a poly(hydroxyamino ether) having repeating units represented by the Formula:

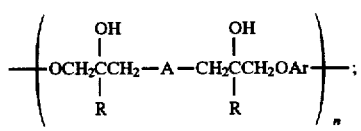

wherein each Ar individually represents a divalent aromatic moiety, substituted divalent aromatic moiety or heteroaromatic moiety wherein the substituent(s) is a monovalent moiety which is inert in the reactions used to produce the hydroxy-phenoxyether polymer, or a combination of different divalent aromatic moieties, substituted aromatic moieties or heteroaromatic moieties wherein the substituent(s) is a monovalent moiety which is inert in the reactions used to produce the hydroxy-phenoxyether polymer; R is individually hydrogen or a monovalent hydrocarbyl moiety; A is an amine moiety or a combination of different amine moieties; and n is an integer from about 10 to about 1.000.

5. The laminate structure of claim 1 wherein the crystalline polyester is polyethyleneterphthalate.

6. The laminate structure of claim 1 wherein the polyamide is polyamide-6; polyamide-6.6; or polyamide 12.

7. The laminate structure of claim 2 in the form of a packaging material.

8. The laminate structure of claim 3 in the form of a packaging material.

* * * * *